United States Patent
Itoh et al.

(10) Patent No.: US 8,269,936 B2
(45) Date of Patent: Sep. 18, 2012

(54) LIQUID CRYSTAL DISPLAY DEVICE

(75) Inventors: Ryohki Itoh, Osaka (JP); Satoshi Horiuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 115 days.

(21) Appl. No.: 12/678,786

(22) PCT Filed: Sep. 9, 2008

(86) PCT No.: PCT/JP2008/066251
§ 371 (c)(1),
(2), (4) Date: Mar. 18, 2010

(87) PCT Pub. No.: WO2009/063684
PCT Pub. Date: May 22, 2009

(65) Prior Publication Data
US 2010/0259702 A1     Oct. 14, 2010

(30) Foreign Application Priority Data

Nov. 16, 2007     (JP) ................................. 2007-298575

(51) Int. Cl.
G02F 1/1337     (2006.01)
(52) U.S. Cl. ....................................................... 349/129
(58) Field of Classification Search .................... 349/129
See application file for complete search history.

(56) References Cited

U.S. PATENT DOCUMENTS

| | | | |
|---|---|---|---|
| 6,410,358 B1 | 6/2002 | Noritake et al. | |
| 6,424,397 B1 | 7/2002 | Kuo | |
| 7,119,870 B1 | 10/2006 | Nishikawa et al. | |
| 2002/0003588 A1 | 1/2002 | Okada et al. | |
| 2002/0076845 A1 | 6/2002 | Noritake et al. | |
| 2004/0017521 A1 | 1/2004 | Okada et al. | |
| 2006/0038948 A1 | 2/2006 | Nishikawa et al. | |
| 2006/0285045 A1 | 12/2006 | Nishikawa et al. | |
| 2007/0002253 A1 | 1/2007 | Kim et al. | |
| 2007/0046875 A1 | 3/2007 | Nishikawa et al. | |
| 2007/0046876 A1 | 3/2007 | Nishikawa et al. | |
| 2007/0109482 A1 | 5/2007 | Kim | |
| 2007/0236414 A1 | 10/2007 | Lin | |

FOREIGN PATENT DOCUMENTS

| | | |
|---|---|---|
| JP | 4-121712 A | 4/1992 |
| JP | 2001-194671 A | 7/2001 |
| JP | 2001-215515 A | 8/2001 |
| JP | 2001-281682 A | 10/2001 |

*Primary Examiner* — Phu Vu
(74) *Attorney, Agent, or Firm* — Birch, Stewart, Kolasch & Birch, LLP

(57) ABSTRACT

An active matrix substrate (10) included in a liquid crystal display device of the present invention is arranged such that (i) source bus lines (12) (signal wires) are disposed so that each of the source bus lines (i) partially overlaps its corresponding pixel electrodes (14) adjacent to each other along a direction in which gate bus lines (11) (scanning wires) extend and (ii) leads from a border between the pixel electrodes (14) toward a central part of each of the pixel electrodes (14), and in the meantime, the source bus lines (12) are disposed so that at least part of overlap between each of the source bus lines (12) and the pixel electrodes (14) overlaps ribs (26) (orientation-changing sections) that change orientation of liquid crystal molecules contained in a liquid crystal layer. This achieves a liquid crystal display device capable of reducing display unevenness of an image without decreasing an aperture ratio even in a case where signal wires are disposed so that each of them leads toward central parts of corresponding pixel electrodes.

8 Claims, 9 Drawing Sheets

$Cs d_{self} = Cs d_{other}$

LIQUID CRYSTAL DISPLAY DEVICE

TECHNICAL FIELD

The present invention relates to liquid crystal display devices that are used as display devices in various types of equipment such as AV (Audio-Visual) equipment or OA (Office Automation) equipment and in vehicles.

BACKGROUND ART

Liquid crystal display devices can be driven at low voltages with low electric power, and as such, have recently been employed as thin and light flat-panel displays in a broad range of commercially available products. Known as such a liquid crystal display device is a matrix liquid crystal display device.

The matrix liquid crystal display device, which has pixels arranged in a matrix manner, displays an image, a character, or the like, by applying a drive voltage independently to each of the pixels and thereby causing a change in optical characteristic of liquid crystals. Among such matrix liquid crystal display devices, an active matrix liquid crystal display device is capable of displaying a high quality image with characteristics such as a high contrast and a high response speed because the active matrix liquid crystal display device has a switching element such as a TFT (Thin Film Transistors) or MIM (Metal Insulator Metal) provided in each pixel.

As for such an active matrix liquid crystal display device, there has been proposed a structure, intended to improve an aperture ratio of pixel electrodes, in which (i) the pixel electrodes are provided on an interlayer insulating film and (ii) the pixel electrodes are provided on a layer different from a layer on which the respective signal wires are provided. This causes each of the pixel electrodes and a corresponding one of the signal wires to overlap each other (e.g., see Patent Literature 1).

However, an active matrix liquid crystal display device structured as mentioned above causes a larger electrostatic capacitance Csd between a pixel electrode and a corresponding signal wire, as compared to a structure in which a pixel electrode is away from a corresponding signal wire by a predetermined distance. Accordingly, a pixel electric potential becomes likely to be changed by a corresponding source signal in response to an increase in capacitance Csd. This leads to deterioration in display characteristic, and such deterioration is called shadowing.

In view of the circumstances, there has been proposed dot inversion driving. The dot inversion driving is a driving method for suppressing such a change in pixel electric potential as is caused by the capacitances Csd between the signal wires and the pixel electrodes. According to the dot inversion driving, a polarity of each source signal is inverted every gate line, and at the same time, a polarity of each signal is inversed every source line.

Employment of such dot inversion driving makes it possible to dramatically reduce the shadowing phenomenon, as compared to 1H line inversion driving, thus making it possible to improve the display quality of a liquid crystal display device. In particular, the shadowing phenomenon can be dramatically reduced by lessening a difference between a capacitance Csd1 and a capacitance Csd2 respectively corresponding to pixels adjacent to each other along a direction in which scanning wires extend.

On the other hand, however, the dot inversion driving causes an increase in transmittance difference due to variation among the capacitances Csd between the signal wires and the pixel electrodes. Such an increase leads to an increase in the likelihood of variation in width of overlaps between the signal wires and the pixel electrodes among blocks, i.e., block separation (display unevenness), because there may occur misalignment in a case where a photolithographic step is carried out in units of blocks.

The term "block" here means one of those regions in a display panel which are defined so that exposures are performed in the respective regions. Examples of an exposure method encompass: a method for carrying out a step-and-repeat exposure with use of one or more masks; a method for carrying out a scanning exposure more than once with use of one or more masks; and a method for carrying out scanning exposures in a plurality of blocks at a time with use of one or more masks.

In view of the circumstances, Patent Literature 2 proposes an active matrix liquid crystal display device capable of preventing such deterioration in display quality as is caused by capacitances Csd between signal electrodes and pixel electrodes, and at the same time, suppress such block separation (display unevenness) as is caused by variation among the capacitances Csd.

Patent Literature 2 illustrates, in FIG. 4, one example of such a configuration for suppressing the occurrence of display unevenness. According to this configuration, each signal wire has a bent portion in the vicinity of first and second pixel electrodes adjacent to each other. With the bent portion as a border, one part of the signal wire is covered with the first pixel electrode, and the other part of the signal wire is covered with the second electrode.

Such a configuration is believed to lessen differences in transmittance among the blocks, because even if there occurs a certain degree of misalignment between one block and another in a photolithographic step the configuration reduces variation among the capacitances Csd between the signal wires and the pixel electrodes, even with each pixel electrode shaped into a rectangle as has been the case conventionally.

CITATION LIST

Patent Literature 1

Japanese Patent Application Publication, Tokukaihei, No. 4-121712 A (Publication Date: Apr. 22, 1992)

Patent Literature 2

Japanese Patent Application Publication, Tokukai, No. 2001-281682 A (Publication Date: Oct. 10, 2001)

SUMMARY OF INVENTION

In order to suppress display unevenness, it is necessary to suppress such a change in width of overlaps between the signal wires and the pixel electrodes as is caused by misalignment. However, when the signal wires are disposed so that each of them leads toward central parts of corresponding ones of the pixel electrodes as described in the conventional technique, an aperture ratio of pixels is decreased.

The present invention has been made in view of the problems, and an object of the present invention is to achieve a liquid crystal display device capable of reducing display unevenness of an image without decreasing an aperture ratio even in a case where signal wires are disposed so that each of them leads toward central parts of corresponding pixel electrodes.

In order to attain the object, a liquid crystal display device according to the present invention includes an active matrix substrate, a counter substrate, and a liquid crystal layer sandwiched between the active matrix substrate and the counter substrate, the active matrix substrate comprising: a plurality of scanning signal lines; a plurality of signal wires disposed in such a way as to intersect with the plurality of scanning signal lines; and pixel sections, each provided in correspondence with a combination of a corresponding one of the scanning signal lines and a corresponding one of the signal wires, which include respective switching elements each of which connects the corresponding signal wire to a corresponding pixel electrode when a scanning signal inputted to the corresponding scanning signal line commands the switching element to be conductive, the signal wires being disposed so that each of the signal wires (i) partially overlaps its corresponding pixel electrodes adjacent to each other along a direction in which the scanning signal lines extend and (ii) leads from a border between the pixel electrodes toward a central part of each of the pixel electrodes, the signal wires being disposed so that at least part of overlap between each of the signal wires and the pixel electrodes overlaps orientation-changing sections that change orientation of liquid crystal molecules contained in the liquid crystal layer.

In a case where a photolithographic step is carried out in units of blocks in process of manufacture of a liquid crystal display device, there occurs misalignment between one block and another. This causes a change in width of overlaps between the signal wires and the pixel electrodes, thus causing a change in capacitances Csd between the signal wires and the pixel electrodes. Further, in a case where dot inversion driving is employed, a pixel voltage becomes likely to be changed in response to the change in capacitances Csd. This leads to variation in transmittance among the blocks, thus causing display unevenness.

In order to solve such a problem, the liquid crystal display device of the present invention is arranged such that the plurality of signal wires are disposed so that (i) each of the plurality of signal wires partially overlaps with both of any adjacent ones of the pixel electrodes provided along a direction in which the plurality of scanning wires extend and (ii) each of the plurality of signal wires leads into from a border between the any adjacent ones of the pixel electrodes toward a central part of each of the any adjacent ones of the pixel electrodes. That is, the signal wires are disposed so that each of them meanders along borders between its corresponding adjacent pixel electrodes in such a way as to alternately lead into the pixel electrodes from the borders.

According to the foregoing configuration, even if there occurs a certain degree of misalignment between one block and another in a photolithographic process, the change in capacitances Csd between the signal wires and the pixel electrodes can be suppressed. This makes it possible to suppress the variation among the capacitances Csd between the signal wires and the pixel electrodes as caused by the employment of dot inversion driving, thus bringing about an effect of making it possible to reduce the occurrence of display unevenness.

Further, the liquid crystal display device of the present invention is arranged such that each of the plurality of signal wires partially overlaps with, in at least a part of the overlapped area of the each of the plurality of signal wires and the corresponding one of the pixel electrodes, the corresponding one of the orientation-changing parts that change the orientation of the liquid crystal molecules contained in the liquid crystal layer. Those regions in the liquid crystal display device provided with the orientation-changing sections are regions that do not allow light to travel therethrough (light-shielding regions) or regions where there occurs greater loss in transmittance as compared with the other regions in the pixel electrodes. Therefore, even in a case where the signal wires are disposed so that each of them leads toward a central part of each of the pixel electrodes, a decrease in aperture ratio due to the signal wire can be reduced, as long as at least a part of the signal wire overlaps the orientation-changing sections.

As such, the present invention makes it possible to achieve a liquid crystal display device that is capable of reducing the display irregularity of an image without reducing the aperture ratio, even in the case where the plurality of signal wires are disposed so that each of them leads toward the central parts of corresponding ones of the pixel electrodes.

Examples of the orientation-changing sections encompass: ribs or slits provided on a counter substrate side; and slits provided on an active matrix substrate side. The provision of such ribs and slits makes it possible to control the orientation of the liquid crystal molecules contained in the liquid crystal layer and thereby improve a viewing angle of a display panel.

Those regions provided with the ribs differ in liquid crystal molecule orientation from those other regions (normal transmitting sections) in the pixel electrodes. Therefore, those regions provided with the ribs suffer loss in transmittance to become lower in transmittance than the normal transmitting sections. Further, those regions provided with the slits are lower in transmittance than those regions provided with the ribs, and allow little light to travel therethrough. That is, those regions provided with the slits serve as light-shielding regions.

As described above, examples of the orientation-changing sections encompass: ribs or slits provided on a counter substrate side; and slits provided on an active matrix substrate side. Here, it is more preferable to provide the ribs above the signal wires so as to achieve a stable state where the liquid crystal layer is not directly affected by a change in electrical potential of the signal wires. This is because in such a configuration the pixel electrodes (display region) exist above the signal wires.

In view of the circumstances, the liquid crystal display device of the present invention is preferably arranged such that the orientation-changing sections are ribs provided on the counter substrate.

The foregoing configuration makes it possible to achieve a liquid crystal display device having a high aperture ratio and reduced display unevenness, without adversely affecting a display.

However, the present invention is not necessarily limited to such a configuration as described above, and may be configured such that the orientation-changing sections are slits provided in the pixel electrodes, slits provided in the counter substrate, or the like.

In order to reduce the decrease in aperture ratio, it is preferable to provide the orientation-changing sections in those regions in the pixel electrodes where there is greater loss in transmittance. In a case where each of the ribs or slits that control the orientation of liquid crystal molecules has both straight portions and a bent portion, the bent portions cause disorientation of liquid crystal molecules, thus causing loss in transmittance. For example, in a case where a plurality of wedge- or V-shaped ribs or slits are arranged to face the same direction, the liquid crystal molecules are disoriented in a region where the respective corners (each corresponding to a bent portion) of the wedge- or V-shaped ribs or slits are aligned, whereby there occurs loss in transmittance. In the circumstances, provision of the signal wires in such regions makes it possible to reduce the decrease in aperture ratio of pixels.

In view of the circumstances, the orientation-changing sections are preferably the bent portions of the ribs provided on or slits provided in the counter substrate or on the pixel electrodes.

That is, the liquid crystal display device of the present invention is preferably arranged such that the counter substrate and the pixel electrodes have the orientation-changing sections provided thereon as ribs each having a bent shape or provided therein as slits each having a bent shape; and the signal wires are disposed so that at least a part of overlap between each of the signal wires and the pixel electrodes overlaps a bent portion of a corresponding one of the ribs provided on the counter substrate and on the pixel electrodes or a bent portion of a corresponding one of the slits provided in the counter substrate and in the pixel electrodes.

Further, the liquid crystal display device of the present invention may be arranged such that the counter substrate has provided thereon ribs each having straight portions and a bent portion, and the pixel electrodes have provided therein slits each having straight portions and a bent portion; and the signal wires are disposed so that each of the signal wires overlaps the pixel electrodes in such a way as to partially overlap the straight portions and bent portions of the ribs and the straight portions and bent portions of the slits.

According to the foregoing configuration, the signal wires are disposed in such a way as to overlap the light-shielding regions in the pixel electrodes or those regions in the pixel electrodes where there is great loss in transmittance. This makes it possible to further reduce the decrease in aperture ratio.

The liquid crystal display device of the present invention is preferably arranged such that the signal wires and the pixel electrodes are disposed so that those ones of the pixel electrodes which are adjacent to each other with one of the signal wires interposed therebetween are identical in area of overlap with the signal wire.

This configuration can cause the capacitance Csd between the source bus line and one of its corresponding adjacent pixel electrodes and the capacitance Csd between the signal line and the other pixel electrode to be substantially equal. This makes it possible to prevent a pixel voltage (or a drain voltage) from rising or falling at the time of polarity inversion of the data signals during dot inversion driving to deviate from the design voltage.

The liquid crystal display device of the present invention is preferably arranged such that the signal wires are disposed so that that part of each of the signal wires which overlaps a corresponding one of the orientation-changing parts is at an angle of 45 degrees to 90 degrees with respect to an edge of a corresponding one of the pixel electrodes.

According to this configuration, each of the signal wires overlaps a corresponding one of the pixel electrodes at an angle of not less than 45 degrees. Therefore, each of the signal wires makes less contact with the edge of a corresponding one of the pixel electrodes. Accordingly, it is possible to reduce a change in the area of each of the signal wires as is caused by misalignment. This makes it possible to reduce such a change in the capacitances Csd between the signal wires and the pixel electrodes as is caused by misalignment.

For a fuller understanding of the nature and advantages of the invention, reference should be made to the ensuing detailed description taken in conjunction with the accompanying drawings.

REFERENCE SIGNS LIST

Figure 1:
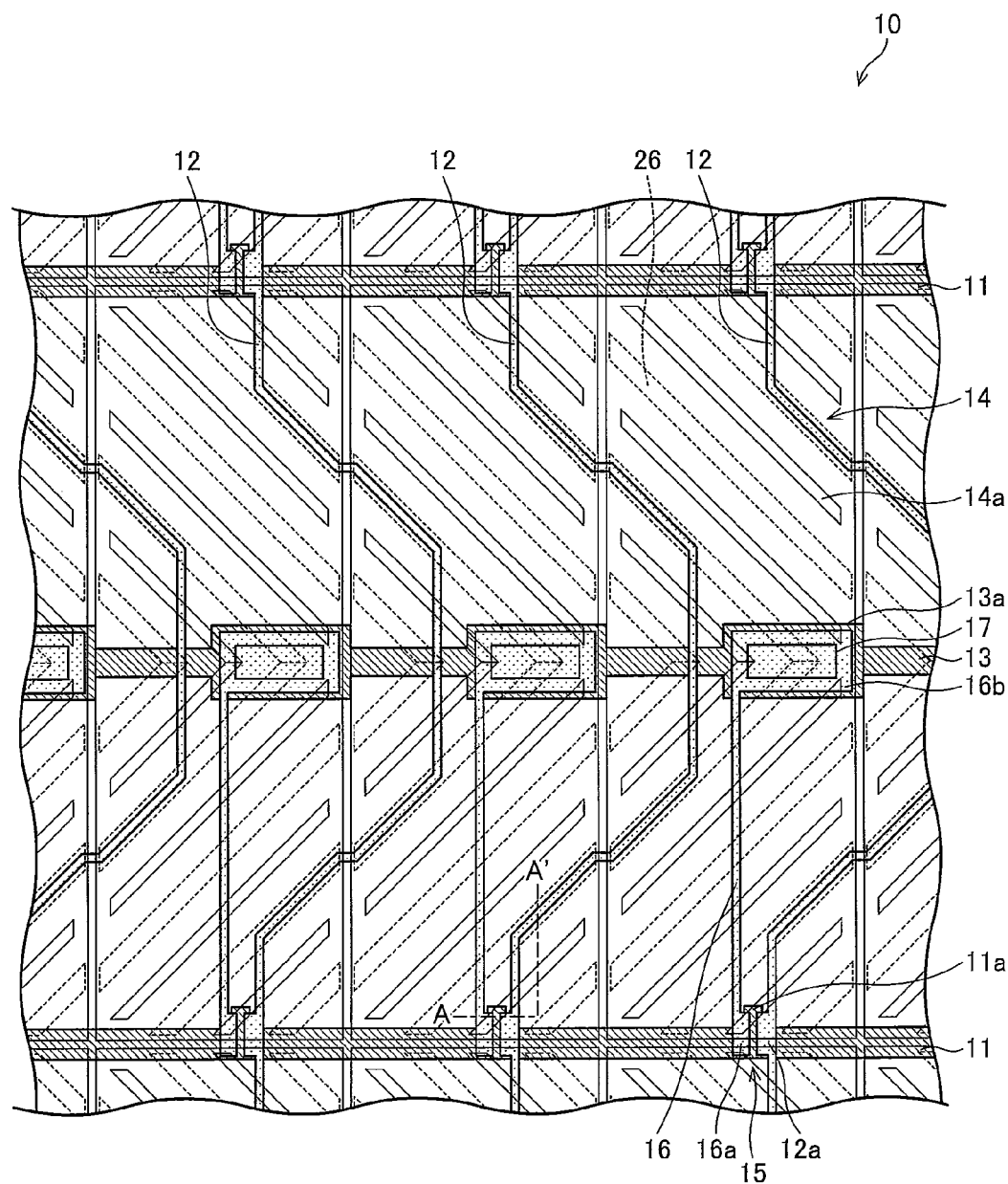
FIG. 1 is a plan view illustrating a configuration of a part of an active matrix substrate included in a liquid crystal display device according to one embodiment of the present invention.

1 Liquid crystal display device
10 Active matrix substrate
11 Gate bus line (scanning wire)
11a Gate electrode
12 Source bus line (signal wire)
12a Source electrode
13 Storage capacitor wire
14 Pixel electrode
14a Slit (orientation-changing section)
14b Slit (orientation-changing section)
15 TFT (switching element)
20 Counter substrate
26 Rib (orientation-changing section)
30 Liquid crystal layer
36 Rib (orientation-changing section)
46 Slit (orientation-changing section)
50 Active matrix substrate
51 Liquid crystal display device
60 Active matrix substrate
61 Liquid crystal display device

DESCRIPTION OF EMBODIMENTS

Embodiments of the present invention are described below with reference to FIGS. 1 through 13. It should be noted that the present invention is not limited to these embodiments.

The present embodiment describes an active matrix liquid crystal display device having an active matrix substrate including: a plurality of gate bus lines (scanning wires); a plurality of source bus lines (signal wires) disposed in such a way as to intersect with the plurality of gate bus lines; and pixel sections having respective TFTs (switching elements) provided in the vicinity of intersections between the gate bus lines and the source bus lines. It should be noted that what is described here is a liquid crystal display device having an SHA (Super High Aperture) structure with an aperture ratio improved by reducing a distance between one pixel electrode and another and, at the same time, with an increase in thickness of an interlayer insulating film. However, the present invention is not necessarily limited to such a configuration.

First, a configuration of a liquid crystal display device 1 according to the present embodiment is described with reference to FIGS. 1 and 2.

FIG. 1 illustrates a configuration of a part of an active matrix substrate 10 included in the liquid crystal display device 1 according to the present embodiment. Although FIG. 1 illustrates a configuration of the active matrix substrate 10 in a plane, FIG. 1 contains dotted lines, for convenience of description, which indicate ribs provided on a counter substrate 20. FIG. 2 is a cross-sectional view illustrating a configuration of the liquid crystal display device 1. Note that FIG. 2 is a cross-sectional view of a region taken along the line A-A' of FIG. 1 (a region including a TFT 15, a rib 26, and a slit 14a).

Figure 2:
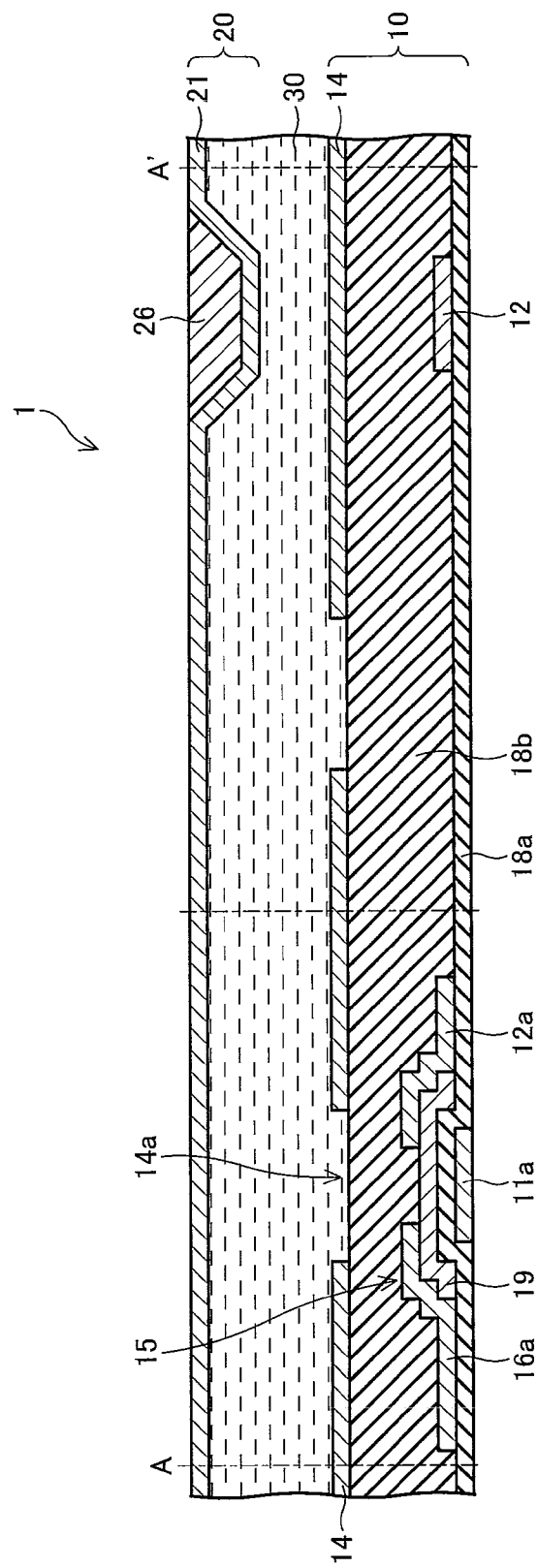
FIG. 2 is a cross-sectional view of the liquid crystal display device according to the one embodiment of the present invention, taken along the line A-A' of FIG. 1.

As illustrated in FIG. 2, the liquid crystal display device includes the active matrix substrate 10, the counter substrate 20, and a vertical alignment type liquid crystal layer 30 sandwiched between the active matrix substrate 10 and the counter substrate 20. Provided on those surfaces of the active matrix substrate 10 and the counter substrate 20 which are facing the liquid crystal layer 30 are vertical alignment films (not illustrated), which cause liquid crystal molecules contained in the liquid crystal layer 30 to be aligned substantially perpendicular to surfaces of the vertical alignment film while no voltage is being applied. That is, the liquid crystal display device 1 is a vertical alignment type liquid crystal display device. The liquid crystal layer 30 contains a nematic liquid crystal material having negative dielectric anisotropy.

The liquid crystal display device 1 includes: pixel electrodes 14 provided on the active matrix substrate 10; and counter electrodes 21 provided on the counter substrate 20. Each of the pixel sections is constituted by a corresponding portion of the liquid crystal layer 30 as sandwiched between a corresponding one of the pixel electrodes 14 and a corresponding one of the counter electrodes 21. In the present embodiment, both the pixel electrodes 14 and the counter electrodes 21 are formed from transparent conductive layers made of ITO (Indium Tin Oxide). Provided on that surface of the counter substrate 20 which is facing the liquid crystal layer 30 are: color filters (not illustrated) corresponding to the respective pixel sections; and black matrices (not illustrated) each provided between its corresponding adjacent ones of the color filters. Provided on the color filters and the black matrices are the counter electrodes 21.

As illustrated in FIG. 1, the active matrix substrate 10 has provided thereon (i) a plurality of gate bus lines 11 extending transversely in FIG. 1 in parallel with one another and (ii) a plurality of source bus lines 12 extending longitudinally in FIG. 1 and intersecting with the gate bus lines 11. Disposed in parallel with the gate bus lines 11 are storage capacitor wires 13 each provided between its two corresponding gate bus lines 11.

Provided in the vicinity of intersections between the gate bus lines 11 and the source bus lines 12 are TFTs 15, respectively. The TFTs 15 serve as switching elements each of which is electrically connected to a corresponding one of the gate bus lines 11 and a corresponding one of the source bus lines 12. The pixel electrodes 14 are provided in correspondence with the respective TFTs 15. Each of the TFTs 15 connects the corresponding source bus line 12 to the corresponding pixel electrode 14 when a scanning signal inputted to the corresponding gate bus line 11 commands the TFT 15 to be conductive, whereby a data signal transmitted to the corresponding source bus line 11 is inputted to the corresponding pixel electrode 14.

In the following, the configuration of the active matrix substrate 10 and counter substrate 20 included in the liquid crystal display device 1 is described more specifically.

As illustrated in FIGS. 1 and 2, the active matrix substrate 10 has a plurality of gate bus lines (scanning wires) 11, disposed on a glass substrate (not illustrated) in parallel with one another, which are made of metal such as Al and Ta. Each of the gate bus lines 11 has a film thickness of 2000 Å to 5000 Å. The storage capacitor wires 13 are provided on the same layer as the gate bus lines 11. Disposed further above via a gate insulating film 18a made of SiNx or the like are a plurality of source bus lines 12, made of metal such as Al and Ta, which intersect with the gate bus lines 11. The gate insulating film 18a has a film thickness of 2000 Å to 5000 Å and a relative permittivity of approximately 3 to 8. Further, each of the source bus lines 12 has a film thickness of 1000 Å to 5000 Å.

Disposed in the vicinity of intersections between the gate bus lines 11 and the source bus lines 12 are TFTs 15, respectively. As illustrated in FIG. 2, each of the TFTs 15 is constituted by a stack of (i) a gate electrode 11a, (ii) the gate insulating film 18a, (iii) a semiconductor layer 19, and (iv) a source electrode 12a and a drain electrode 16a. The gate electrode 11a is made of the same material as the gate bus lines 11. The source electrode 12a and the drain electrode 16a are made of the same material as the source bus lines 12. The semiconductor layer 19 is made of an n$^+$ amorphous silicon film doped with impurities. Further, the gate electrode 11a is connected to a corresponding one of the gate bus lines 11, whereas the source electrode 12a is connected to a corresponding one of the source bus lines 12.

It should be noted that the materials, film thicknesses, and the like of the members as described above serve only to constitute one example of the liquid crystal display device of the present invention. The present invention is not limited to such a configuration.

Each of the storage capacitor wires 13 is provided between its two corresponding gate bus lines 11 disposed in parallel with each other, and extends along a direction in which the gate bus lines 11 extend. Each of the storage capacitor wires 13 has portions that are wider than the other portions of the storage capacitor wire 13. Such wider portions are referred to as spread portions 13a, and each of the spread portions 13a is provided in a corresponding one of the pixel electrodes 14. Further provided in such a way as to overlap the spread sections 13a are capacitor electrodes 16b.

Each of the capacitor electrodes 16b is connected to a corresponding one of the pixel electrodes 14 through a corresponding contact hole 17 provided in a corresponding region of the interlayer insulating film 18b, and is connected to a corresponding drain drawing wire 16 provided on the same layer as the capacitor electrode 16b. In this way, storage capacitances are formed between the storage capacitor wires 13 (specifically, the spread sections 13a) and the capacitor electrodes 16b.

Further, the pixel electrodes 14 has provided therein slits 14a (orientation-changing sections) for controlling the orientation of liquid crystal molecules contained in the liquid crystal layer 30. The slits 14a thus provided in the pixel electrodes 14 cause oblique electrical fields to be generated in response to a voltage applied. This makes it easy to orient the liquid crystal molecules obliquely.

On the other hand, as illustrated in FIG. 2, the counter substrate 20 has red, green, and blue color filters (not illustrated) provided on a glass substrate (not illustrated) in such a way as to correspond to the respective pixel electrodes 14. Further provided between one color filter and another are black matrices (not illustrated) that are light-shielding films which prevent light from leaking from between adjacent ones of the pixel electrodes 14 and which prevent color mixture.

Provided above a color filter layer constituted by the color filters and the black matrices are ribs 26 for controlling the orientation of the liquid crystal molecules contained in the liquid crystal layer 30. As illustrated in FIG. 2, the ribs 26 are tapered projections each of which has an inclined plane with respect to a plane that is parallel with the counter substrate. Note, however, that such a shape is just an example, and the shape of the ribs 26 of the present invention may be any shape provided that the shape is one in which a rib is generally used. Note that, in FIG. 1, the positions of the ribs 26 with respect to the pixel electrodes 14 are indicated by the dotted lines.

Provided above the color filter layer and the ribs provided partially on the color filter layer are the counter electrodes 21 made of a transparent conductive material.

The active matrix substrate 10 and counter substrate 20 thus configured are disposed at a predetermined distance so that the pixel electrodes 14 of the active matrix substrate 10 and the counter electrodes 21 of the counter substrate 20 face each other. Then, the liquid crystal layer 30 is injected into the space between the active matrix substrate 10 and the counter substrate 20, and is sealed in with a sealing material. In this way, the liquid crystal display device 1 is formed.

The following describes the disposition of the source bus lines 12 in the liquid crystal display device 1. According to the present embodiment, as illustrated in FIG. 1, the source bus lines 12 are disposed so that each of them (i) partially overlaps its corresponding pixel electrodes 14 adjacent to each other along a direction in which the gate bus lines 11 extend and (ii) leads from a border between the pixel electrodes 14 toward a central part of each of the pixel electrodes 14. The phrase "disposed . . . toward a central part of each of the pixel electrodes 14" here means that, as illustrated in FIG. 1, the source bus lines 12 are disposed so that each of them leads into each of its corresponding adjacent pixel electrodes 14 from an edge of the pixel electrode 14 toward inside of the pixel electrode 14 and then leads through the pixel electrode 14 at a given distance from the edge of the pixel electrode 14.

According to a conventional, commonly used active matrix liquid crystal display device, a plurality of source bus lines and a plurality of gate bus lines extend straight so that the source bus lines and the gate bus lines form a lattice pattern, and pixel electrodes are disposed in respective rectangular regions each surrounded by its two corresponding source bus lines and its two corresponding gate bus lines. In contrast, according to the present embodiment, the source bus lines 12 are disposed in a zigzag pattern so that each of them meanders in a zigzag pattern to overlap its corresponding pixel electrodes 14 adjacent to each other along the direction in which the plurality of gate bus lines 11 extend.

Such a disposition of the source bus lines 12 that each of them meanders to overlap its corresponding adjacent pixel electrodes 14 makes it possible to dispose the source bus lines at a distance from an edge of each of the corresponding pixel electrodes 14. As such, it is possible to reduce an effect of misalignment even in a case where a display is carried out by dot inversion driving.

This is described below with reference to FIGS. 3 through 9.

Figure 3:
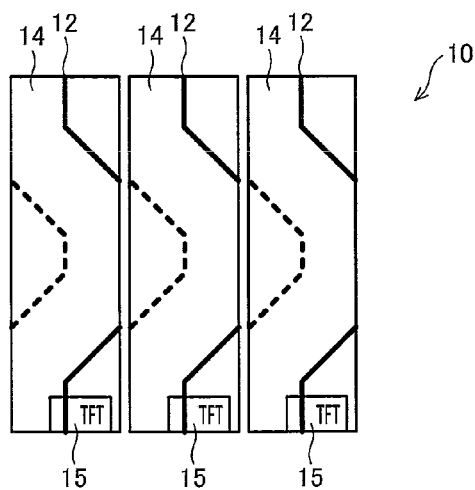
FIG. 3 schematically illustrates the configuration of the liquid crystal display device of FIG. 1.
Figure 4:
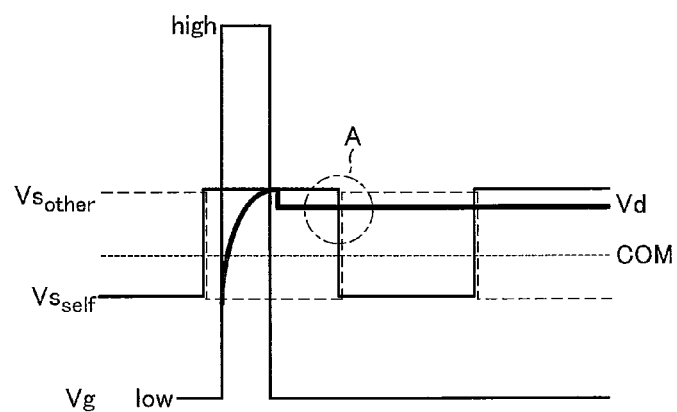
FIG. 4 illustrates waveforms of signals applied to the liquid crystal display device of FIGS. 3 and 5.
Figure 5:
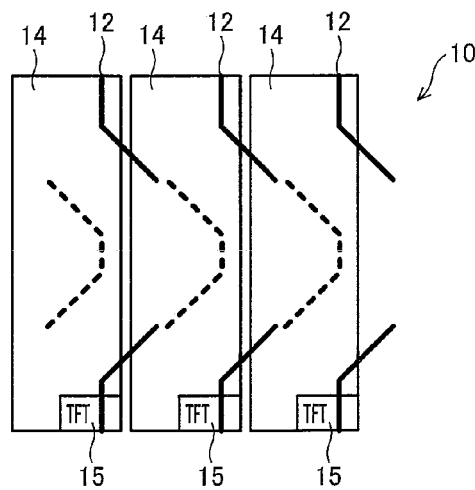
FIG. 5 is a schematic view illustrating the liquid crystal display device of FIG. 3, in which misalignment has occurred.
Figure 6:
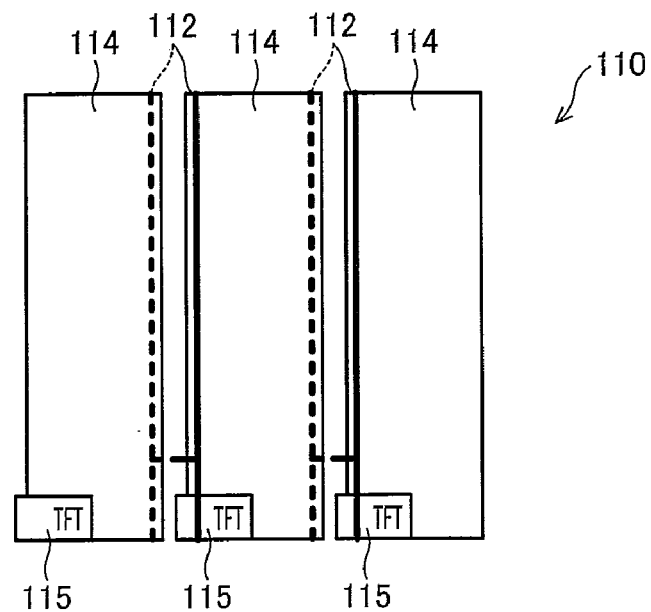
FIG. 6 schematically illustrates a configuration of a conventional liquid crystal display device.

FIGS. 3 through 5 illustrate a case where source bus lines are disposed in a zigzag pattern as in the present embodiment. For comparison, FIGS. 6 through 9 illustrate a case where source bus lines are disposed straight. It should be noted that such a structure as illustrated in FIG. 6 that two source bus lines are disposed in such a way as to overlap the respective adjacent pixel electrodes is a structure which has been employed in a conventional liquid crystal display device and which makes it possible to reduce such a change in capacitance Csd as is caused by misalignment but causes a decrease in aperture ratio.

FIGS. 3 and 5 schematically illustrate a configuration of a part of the active matrix substrate 10 included in the liquid crystal display device 1 of the present embodiment. Note that, in the active matrix substrate 10 of FIGS. 3 and 5, members other than pixel electrodes 14, source bus lines 12, and TFTs 15 are not illustrated. FIG. 3 illustrates a configuration of the active matrix substrate 10 in which no misalignment has occurred. FIG. 5 illustrates a configuration of the active matrix substrate 10 in which misalignment has occurred.

Figure 8:
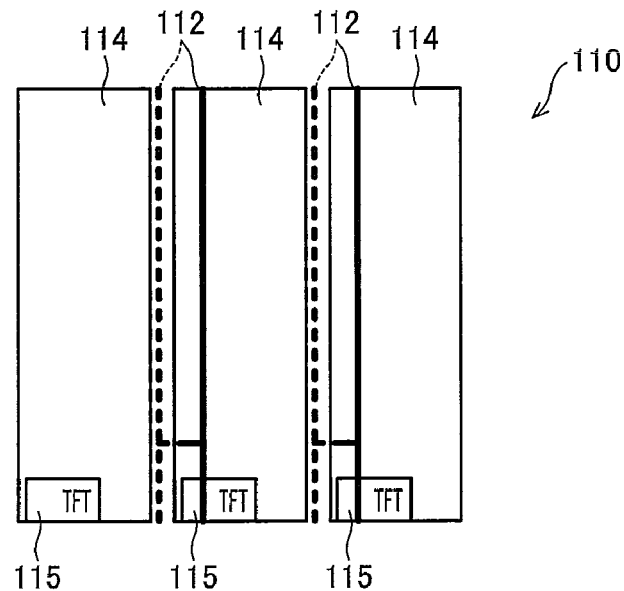
FIG. 8 is a schematic view illustrating the liquid crystal display of FIG. 6, in which misalignment has occurred.

FIGS. 6 and 8 schematically illustrate a configuration of a part of an active matrix substrate 110 included in a conventional liquid crystal display device. Note that, in the active matrix substrate 110 of FIGS. 6 and 8, members other than pixel electrodes 114, source bus lines 112, and TFTs 115 are not illustrated. FIG. 6 illustrates a configuration of the active matrix substrate 110 in which no misalignment has occurred. FIG. 8 illustrates a configuration of the active matrix substrate 110 in which misalignment has occurred.

Let it be assumed here that Csd represents an overlap capacitance between each of the source bus lines and a corresponding one of the pixel electrodes. With attention focused on one of the pixel electrodes and two source bus lines overlapping the pixel electrode, let it be also assumed that $Csd_{self}$ represents an overlap capacitance between the pixel electrode and one of the two source bus lines (indicated by a solid line) which is connected to the pixel electrode via a corresponding one of the TFTs, and that $Csd_{other}$ represents an overlap capacitance between the pixel electrode and the other one of the two source bus lines (indicated by a dotted line) which is not connected to the pixel electrode via the corresponding TFT.

According to FIG. 3, for example, the source bus lines 12, which are disposed so that each of them meanders to overlap its corresponding adjacent pixel electrodes 14, are illustrated in the following manner. That part of each of the source bus lines 12 which is connected to a corresponding one of the pixel electrodes 14 via a corresponding one of the TFTs 15 and overlaps the corresponding pixel electrode 14 (i.e., a pixel electrode 14 that is driven via this source bus line 12) is indicated by a solid line, whereas that part of each of the source bus lines 12 which overlaps another corresponding one of the pixel electrodes 14 that is not connected to the corresponding TFT 15 (i.e., a pixel electrode 14 that is not driven via this source bus line 12) is indicated by a dotted line. With attention focused on one of the pixel electrodes, an overlap capacitance between the pixel electrode and a source bus line indicated by a solid line is represented as $Csd_{self}$, whereas an overlap capacitance between the pixel electrode and a source bus line indicated by a dotted line is represented as $Csd_{other}$.

In order to suppress display unevenness, it is preferable to minimize the variation among the capacitances Csd. To this end, generally, pixel electrodes and source bus lines are disposed so that $Csd_{self}$ and $Csd_{other}$ are substantially equal to each other. That is, $Csd_{self}$ and $Csd_{other}$ are substantially equal to each other in such a state as illustrated in FIGS. 3 and 6 in which no misalignment has occurred.

Figure 7:
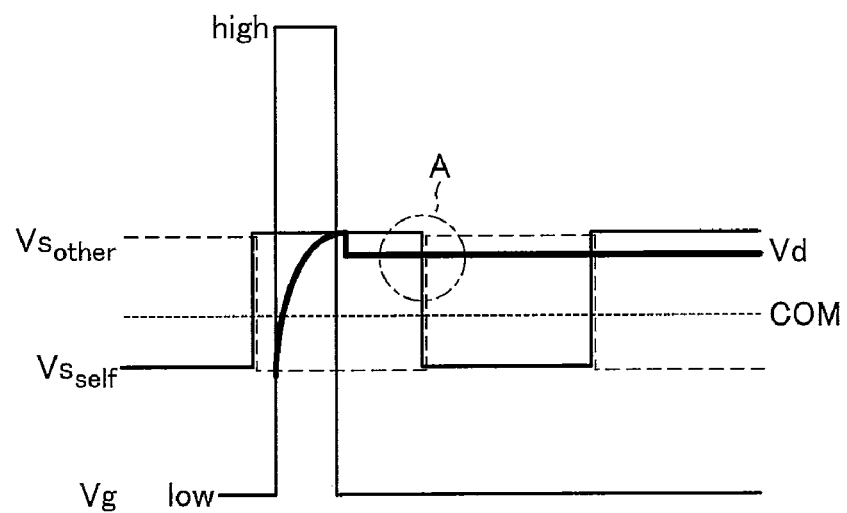
FIG. 7 illustrates waveforms of signals applied to the liquid crystal display device of FIG. 6.

FIGS. 4 and 7 illustrate signal waveforms observed when $Csd_{self}$ and $Csd_{other}$ are substantially equal to each other. FIG. 4 shows waveforms of signals applied to a liquid crystal display device configured as illustrated in FIG. 3, whereas FIG. 7 shows waveforms of signals applied to a liquid crystal display device configured as illustrated in FIG. 6. In FIGS. 4 and 7, Vs denotes a data signal (a signal supplied to a source bus line), Vg denotes a scanning signal (a signal supplied to a gate bus line), COM denotes a common electrode voltage, and Vd denotes a drain voltage actually applied to a pixel electrode.

Here, the signal waveforms are described with attention focused on a pixel electrode in a center position among three pixel electrodes illustrated each of in FIGS. 3 and 6. The liquid crystal display devices illustrated in FIGS. 3 and 6 are driven by dot inversion driving. Therefore, in a case where a source voltage having positive polarity is applied, for example, to the pixel electrode in the center position among three pixel electrodes illustrated in each of FIGS. 3 and 6, source voltages having negative polarity are applied to the pixel electrodes on both sides of the pixel electrode in the center position. With attention focused on the pixel electrode in the center position among three pixel electrodes illustrated in each of FIGS. 3 and 6, $VS_{self}$ (a data signal in the source bus line indicated by the solid line) and $VS_{other}$ (a data signal in the source bus line indicated by the dotted line) have respective polarities opposite to each other.

In a waveform chart of each of FIGS. 4 and 7, the dotted circle "A" indicates a timing at which the polarities of the data signals are inverted after the scanning signal becomes "High" so that data is written to the pixels. At the timing "A", the drain voltage Vd is affected by a rise or fall in electric potential due to the capacitance Csd.

The amount of rise in electric potential due to $Csd_{self}$ and the amount of fall in electric potential due to $Csd_{other}$ are calculated, respectively, according to the following formulas:

(Amount of fall in electric potential due to $Csd_{self}$)= $(Csd_{self}/Cpix) \times Vspp$; and (Amount of rise in electric potential due to $Csd_{other}$)= $(Csd_{other}/Cpix) \times Vspp$, where Vspp represents the amplitude of the source voltage and Cpix represents the total capacitance (consisting of a liquid crystal capacitance and a storage capacitance) in each of the pixel electrodes, the total capacitance being equal in all the pixels.

In a case where no misalignment has occurred, $Csd_{self}$ is equal to $Csd_{other}$. Therefore, the amount of fall in electric potential due to $Csd_{self}$ becomes equal to the amount of rise in electric potential due to $Csd_{other}$. Accordingly, the amount of fall and the amount of rise offset each other at the timing "A" in each of FIGS. 4 and 7. As such, the drain voltage Vd to be applied to the pixels becomes equal to a design voltage.

Figure 9:
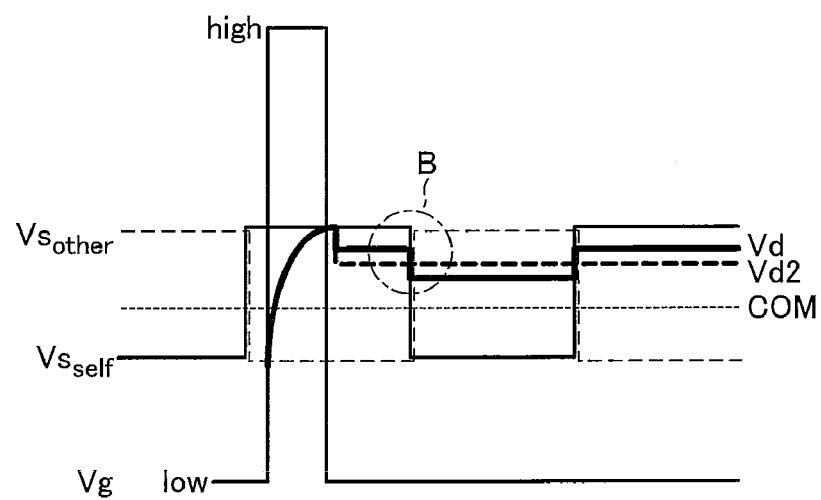
FIG. 9 illustrates a waveforms of signals applied to the liquid crystal display device of FIG. 8.

Next, see a case where misalignment has occurred in such a conventional configuration as illustrated in FIG. 8, with attention focused on one of the pixel electrodes. In such a case, the source bus line indicated by the solid line and the source bus line indicated by the dotted line differ greatly in area of overlap with the pixel electrode. Further, even in a case where the misalignment is not so large that the source bus lines differ in area of overlap with the pixel electrode, the capacitance Csd is still changed due to an oblique electrical field that is generated in response to a change in distance between the source bus lines and an edge of the pixel electrode. This causes a large difference between $Csd_{self}$ and $Csd_{other}$. For example, $Csd_{self}$ becomes greater than $Csd_{other}$. FIG. 9 illustrates waveforms of signals in such a case.

In a waveform chart of FIG. 9, the dotted circle "B" indicates a timing at which the polarities of the data signals are inverted after the scanning signal becomes "High" so that data is written to the pixels. The amount of fall in electric potential due to $Csd_{self}$ and the amount of rise in electric potential due to $Csd_{other}$ at the timing "B" are represented by the following formula: (Amount of fall in electric potential due to $Csd_{self}$)>(Amount of rise in electric potential due to $Csd_{other}$). This is because $Csd_{self}$ is greater than $Csd_{other}$. As such, the drain voltage Vd decreases at the timing "B" because it is more greatly affected by the fall at the timing "B". Accordingly, a voltage Vd2, which is smaller than the drain voltage Vd, is actually applied to the pixels. In this way, the drain voltage Vd2 to be applied to the pixels deviates from the design voltage.

As so far described, even identical values of gradation result in a difference in drain voltage for the pixels between the presence and absence of misalignment. Therefore, when a photolithographic step is carried out in units of blocks, there occurs variation in drain voltage among the blocks, even with identical values of gradation, i.e., there occurs block separation (display unevenness).

In contrast, the configuration, illustrated in FIG. 5, in which the source bus lines are disposed so that each of them meanders, makes it possible to maintain a state where $Csd_{self}$ and $Csd_{other}$ show little change and are substantially equal to each other, even if there occurs misalignment in the configuration. This is because the source bus lines are disposed so that each of them leads away from edges of corresponding ones of the pixel electrodes toward central parts of the corresponding pixel electrodes.

Therefore, even if there occurs misalignment as illustrated in FIG. 5, such waveforms as shown in FIG. 4 are obtained. Therefore, even if there occurs a certain degree of misalignment between one block and another in a photolithographic step during a panel manufacturing process, the variation among the capacitances Csd as caused by variation in width of overlaps between the source bus lines and the pixel electrodes among the blocks is so reduced that display unevenness can be suppressed.

In addition to the above-described configurations, the liquid crystal display device 1 of the present embodiment has such a configuration that at least a part of a region of overlap between each of the source bus lines 12 and a corresponding one of the pixel electrodes 14 overlaps with a corresponding one of the ribs 26 provided on the counter substrate 20. The ribs 26 are provided so as to control the orientation of liquid crystal molecules, and regions provided with the ribs 26 serve as light-shielding regions (non-display regions). That is, such a disposition of the source bus lines 12 that each of them overlaps a corresponding one of the pixel electrodes 14 in such a way as to partially overlap a corresponding one of the ribs 26 makes it possible to suppress such a decrease in aperture ratio as is caused by the provision of the source bus lines 12 on the pixel electrodes 14.

How to dispose the source bus lines is not particularly limited provided that they are disposed so that each of them meanders to overlap its corresponding pixel electrodes adjacent to each other with the source bus line interposed therebetween (pixel electrodes adjacent to each other along a direction in which the gate bus lines extend). However, it is preferable that a capacitance Csd between the source bus line and one of its corresponding adjacent pixel electrodes and a capacitance Csd between the source bus line and the other pixel electrode be substantially equal.

To this end, it is preferable that the signal wires and the pixel electrodes are disposed so that those ones of the pixel electrodes which are adjacent to each other with one of the source bus lines interposed therebetween are identical in area of overlap with the signal wire.

This configuration can cause the capacitance Csd between the source bus line and one of its corresponding adjacent pixel electrodes and the capacitance Csd between the source bus line and the other pixel electrode to be substantially equal. This makes it possible to prevent the source voltage from rising or falling at the time of polarity inversion of the data signals during dot inversion driving to deviate from the design voltage.

Further, it is preferable that that part of each of the source bus lines which overlaps a corresponding one of the ribs be at an angle of 45 degrees to 90 degrees with respect to an edge of a corresponding one of the pixel electrodes. The phrase "angle . . . with respect to an edge of a corresponding one of the pixel electrodes" here means an angle between (i) the source bus line and (ii) a border between its corresponding adjacent rectangular pixel electrodes. That is, for example, the phrase "source bus line at an angle of 90 degrees with respect to an edge of a corresponding one of the pixel electrodes" means that the source bus line is perpendicular to a border between its corresponding adjacent pixel electrodes. Further, the phrase "source bus line at an angle of 45 degrees with respect to an edge of a corresponding one of the pixel electrodes" means that the source bus line is at an angle displaced by 45 degrees from a direction perpendicular to the border.

According to this configuration, each of the source bus lines overlaps a corresponding one of the pixel electrodes at an angle of not less than 45 degrees. Therefore, each of the source bus lines makes less contact with the edge of a corresponding one of the pixel electrodes. Accordingly, it is possible to reduce the area of that part of each of the source bus lines which is close to the edge of a corresponding one of the pixel electrodes. This makes it possible to reduce such a change in the capacitances Csd between the source bus lines and the pixel electrodes as is caused by misalignment.

In the liquid crystal display device of the present embodiment, the width of each of the source bus lines and the width of each of the ribs may be set as appropriate depending on purposes for which the display device can be used, provided that the width is within a range that can be designed. For example, if the aperture ratio needs to be improved, then the width of each of the source bus lines is preferably smaller than the width of each of the ribs. On the other hand, if a contrast needs to be improved, then the width of each of the source bus lines is preferably larger than the width of each of the ribs. As described above, the widths may be changed as appropriate depending on the purposes.

The above-described embodiment has been described by way of example where the source bus lines 12 are disposed in such a way as to overlap the ribs 26 provided on the counter substrate 20. However, the present invention may also be configured such that the source bus lines 12 are disposed in such a way as to overlap slits provided in the pixel electrodes.

Figure 10:
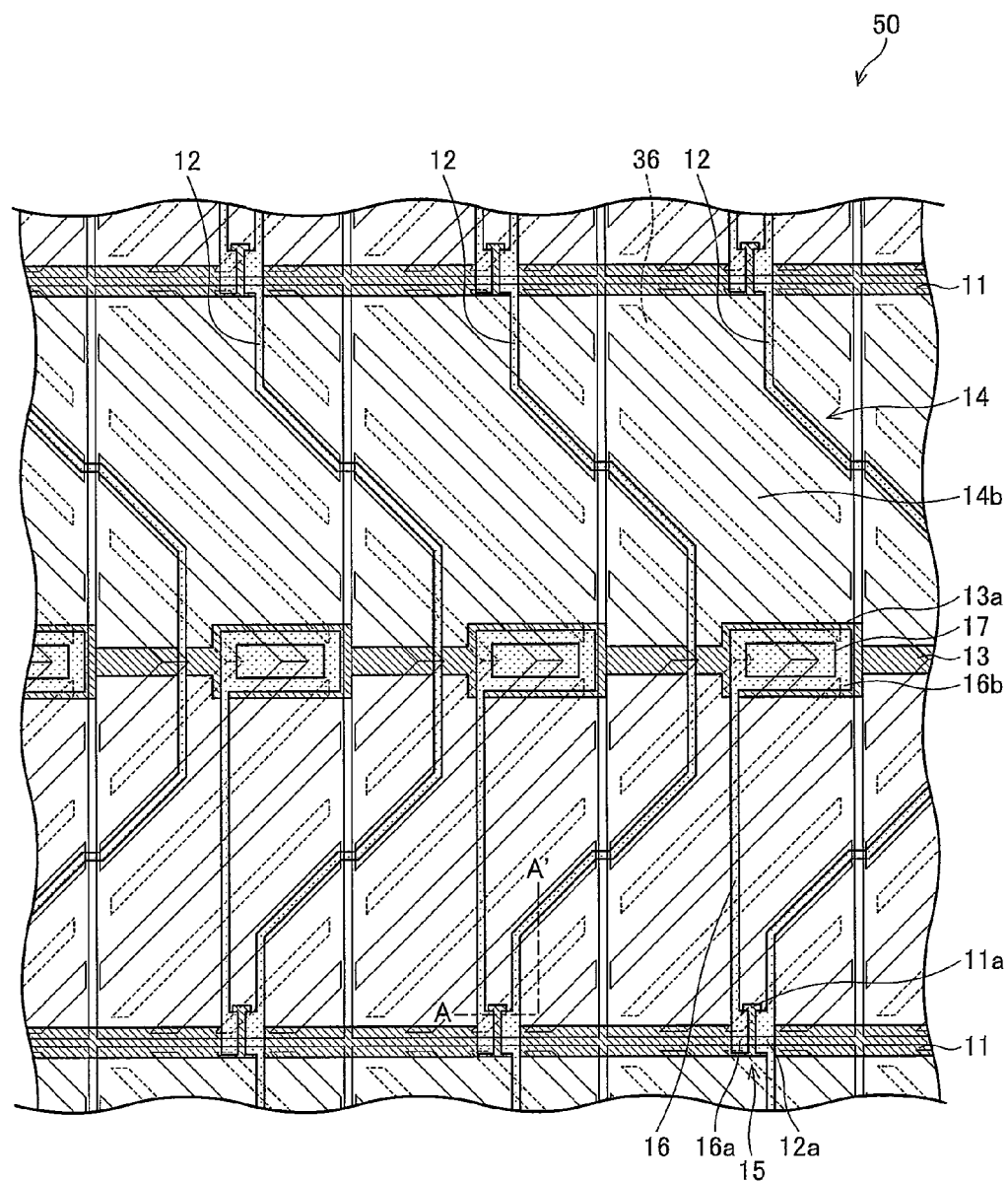
FIG. 10 is a plan view illustrating a configuration of a part of a liquid crystal display device according to another embodiment of the present invention.
Figure 11:
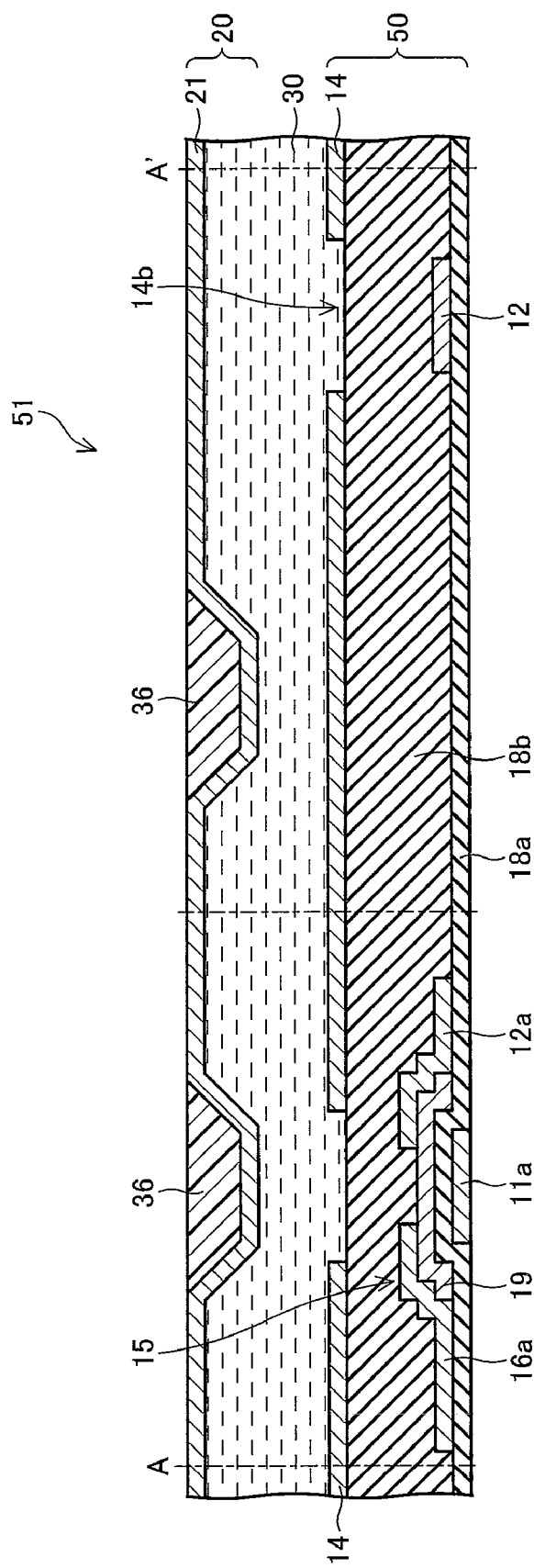
FIG. 11 is a cross-sectional view of the liquid crystal display device according to the another embodiment of the present invention, taken along the line A-A' of FIG. 10.

FIG. 10 illustrates an example of a configuration of an active matrix substrate 50 where each source bus line overlaps its corresponding slits. FIG. 11 is a cross-sectional view illustrating a configuration of a part of a liquid crystal display device 51 including the active matrix substrate 50. This cross-sectional view illustrates a region taken along the line A-A' (a region including a TFT 15, ribs 36, and a slit 14b) of FIG. 10.

The active matrix substrate 50 of FIG. 10 is different from the active matrix substrate 10 of FIG. 1 in terms of positions of the slits 14b (orientation-changing sections) and positions of the ribs 36. The active matrix substrate 50 of FIG. 10 is configured such that the slits 14b are provided in positions corresponding to the positions of the ribs 36 of FIG. 1 and the ribs 36 are provided in positions corresponding to the positions of the slits 14b of FIG. 1. Members other than the slits 14b and the ribs 36 of the active matrix substrate 50 are the same as those of the active matrix substrate 10 of FIG. 1. Accordingly, the same members are given the same reference numerals, and descriptions thereof are omitted here.

Such an active matrix substrate 50 is also configured such that, as illustrated in FIG. 11, each of the source bus lines 12 disposed to overlap the pixel electrodes 14 partially overlaps a region, provided with a corresponding one of the slits 14b, which does not contribute to a display. This makes it possible to prevent a decrease in aperture ratio while suppressing display unevenness by so disposing the source bus lines 12 that each of them leads toward central parts of corresponding ones of the pixel electrodes 14.

Meanwhile, a PVA (Patterned Vertical Alignment) liquid crystal display device has slits so provided on a counter substrate side as to control the orientation of liquid crystal molecules. The present invention can also be applied to such a PVA liquid crystal display device.

Figure 12:
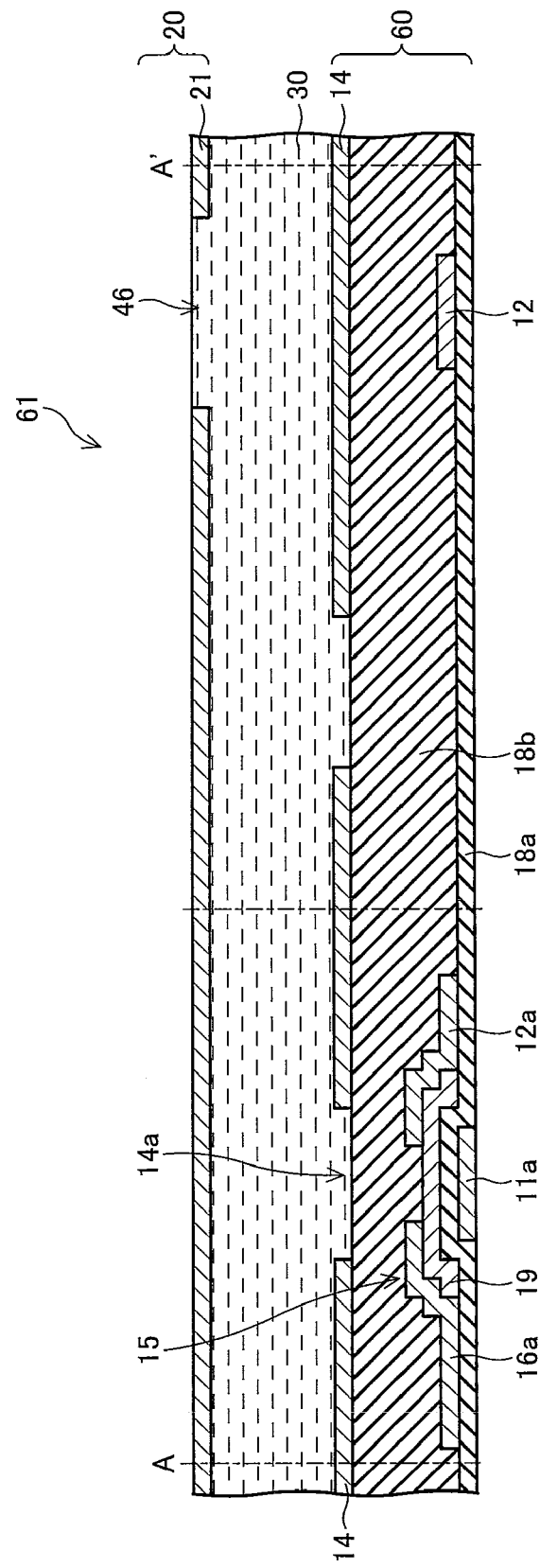
FIG. 12 is a cross-sectional view of a liquid crystal display device according to still another embodiment of the present invention, taken along a line equivalent to the line A-A' of FIG. 1.

FIG. 12 is a fragmentary sectional view of a configuration of a PVA liquid crystal display device 61, taken along a line equivalent to the line A-A' of FIG. 1. The active matrix substrate 60 constituting the liquid crystal display device 61 is substantially identical in planar configuration to the active matrix substrate 10 constituting the liquid crystal display device 1 of FIG. 1, except that the ribs 26 of FIG. 1 have been replaced by slits 46 (orientation-changing sections) in the liquid crystal display device 61.

Such an active matrix substrate 60 is also configured such that, as illustrated in FIG. 12, each of the source bus lines 12 disposed to overlap the pixel electrodes 14 partially overlaps a region, provided with a corresponding one of the slits 46, which does not contribute to a display. This makes it possible to prevent a decrease in aperture ratio while suppressing display unevenness by so disposing the source bus lines 12 that each of them leads toward central parts of corresponding ones of the pixel electrodes 14.

Figure 13:
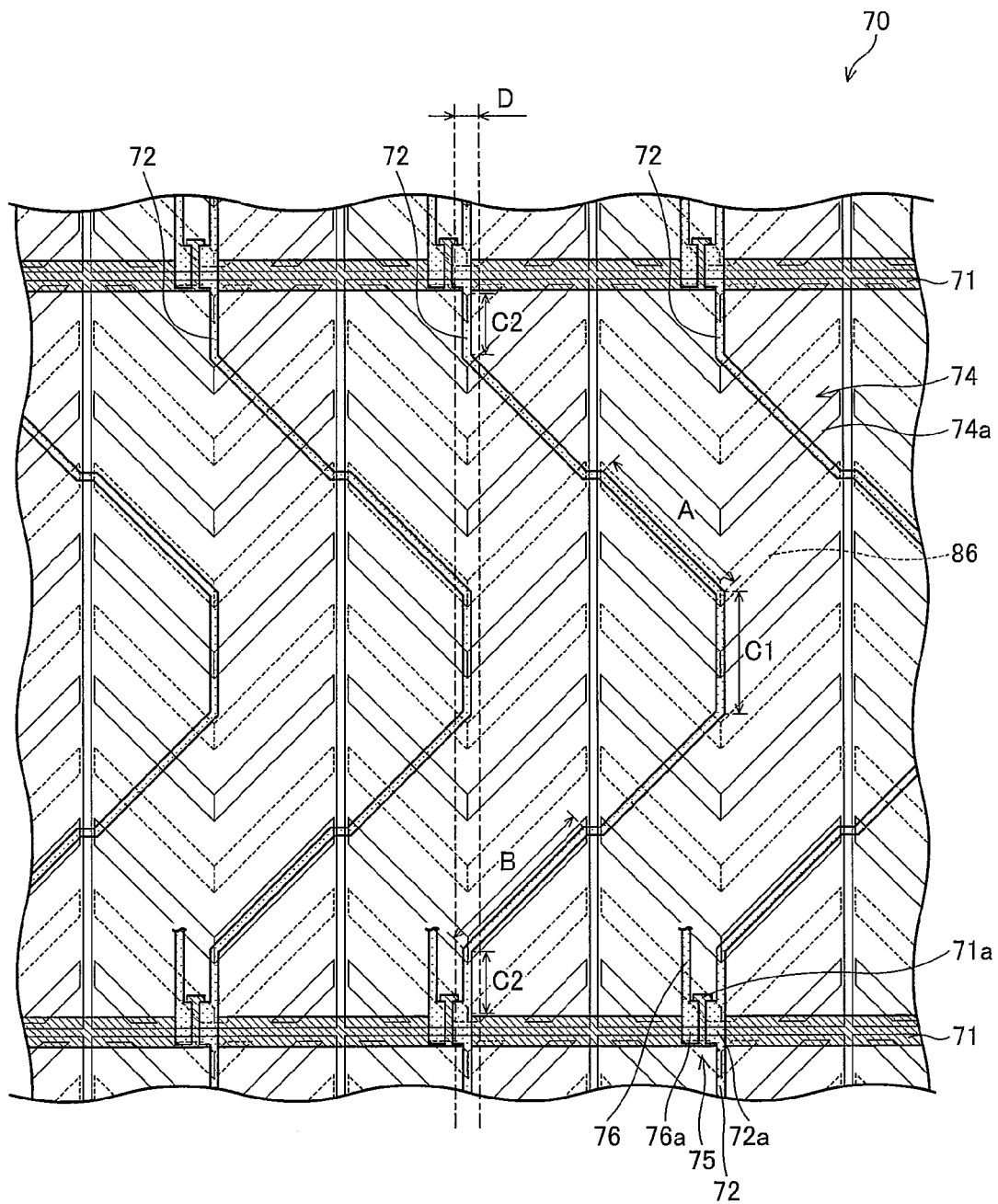
FIG. 13 is a plan view illustrating a configuration of a part of the liquid crystal display device according to the still another embodiment of the present invention.

Still another embodiment of the present invention is described with reference to FIG. 13. FIG. 13 is a plan view illustrating a configuration of a part of an active matrix substrate 70 provided with V-shaped ribs and V-shaped slits and included in a liquid crystal display device.

As illustrated in FIG. 13, the active matrix substrate 70 has provided thereon (i) a plurality of gate bus lines 71 extending transversely in FIG. 13 in parallel with one another and (ii) a plurality of source bus lines 72 extending longitudinally in FIG. 13 and intersecting with the plurality of the gate bus lines 71.

Provided in the vicinity of intersections between the plurality of gate bus lines 71 and the plurality of source bus lines 72 are TFTs 75, respectively. The TFTs 75 serve as switching elements each of which is electrically connected to a corresponding one of the plurality of gate bus lines 71 and a corresponding one of the plurality of source bus lines 72. Provided in correspondence with the respective TFTs 75 are pixel electrodes 74. Each of the TFTs 75 allows conduction between the corresponding source bus line 72 and the corresponding pixel electrode 74 when the corresponding gate bus line 71 is selected and a writing signal Vgh (High) is applied to the corresponding gate bus line 71, whereby a data signal applied to the corresponding source bus line 72 is written to the corresponding pixel electrode 74.

Each of the TFTs 75 is constituted by a stack of (i) a gate electrode 71a, (ii) a source electrode 72a, and (iii) a drain electrode 76a. Note that FIG. 13 omits members such as drain drawing wires 76 drawn from the respective drain electrodes 76a and capacitor electrodes connected to the respective drain drawing wires 76.

As with the active matrix substrate 10 of FIG. 1, the active matrix substrate 70 has slits 74a (orientation-changing sections) provided in the pixel electrodes 74, and also has ribs 86 (orientation-changing sections) provided on a counter substrate (not illustrated). In the liquid crystal display device including the active matrix substrate 70, as illustrated in FIG. 13, the ribs 86 and slits 74a, provided in each of the pixel electrodes 74, each have a letter V shape with straight portions and a bent portion.

In such a case where ribs and slits each have a letter V shape or wedge shape with straight portions and a bent portion, the bent portion causes disorientation of liquid crystal molecules, thus causing loss in transmittance. This is because the liquid crystal molecules oriented regularly with respect to one of the straight portions extending from the bent portion and those regularly oriented with respect to the other straight portion are disoriented by collisions in the vicinity of the bent portion. Such a region of disoriented liquid crystal molecules makes it difficult for light to pass through a polarizing plate, thus causing greater loss in transmittance. Further, in such a case as illustrated in FIG. 13 where a plurality of V-shaped ribs 86 and a plurality of V-shaped slits 74a are arranged to face in the same direction, the liquid crystal molecules are disoriented in a region (a region D indicated by dashed lines in FIG. 13) where the respective corners (each corresponding to a bent portion) of the ribs 86 and slits 74a are aligned, whereby there occurs loss in transmittance.

In view of the circumstances, the embodiment of FIG. 13 is configured such that the plurality of source bus lines 72 are disposed so that each of them partially overlaps such a region D. In FIG. 13, the segments C1 and C2 represent regions of overlap between each of the source bus lines 72 and corresponding regions D. Such a disposition of the source bus lines 72 that each of them partially overlaps a region D where there is great loss in transmittance makes it possible to suppress the decrease in aperture ratio as caused by the source bus lines, thus making it possible to suppress the decrease in aperture ratio across the whole pixel. In the embodiment of FIG. 13, the segment C2 is half as long as the segment C1. However, the present invention is not limited to such a configuration.

Further, the embodiment of FIG. 13 is configured such that each of the source bus lines 72 disposed on the pixel electrodes 74 also partially overlaps a straight portion of a corresponding one of the ribs 86 (a region A of FIG. 13) and a straight portion of a corresponding one of the slits 74a (a region B of FIG. 13). Such a configuration causes each of the source bus lines 72 to be disposed to overlap a light-shielding region of a corresponding one of the pixel electrodes 74 or a region on the corresponding pixel electrode 74 where there is great loss in transmittance. This makes it possible to further reduce the decrease in aperture ratio. In the present embodiment of FIG. 13, the segment A is as long as the segment B. However, the present invention is not necessarily limited to such a configuration.

The present embodiment was described by way of example of a liquid crystal display device having an SHA structure. However, the present invention is not limited to such a configuration, and can also be applied to a liquid crystal display having a Non-SHA structure.

Note that the specific configurations of the liquid crystal display devices as described in the present embodiment (specifically, the disposition of the TFTs, the storage capacitor wires, and the like) are merely examples of the present invention. The present invention is not necessarily limited to such configurations.

As so far described, the liquid crystal display device according to the present invention is characterized in that the signal wires being disposed so that each of the signal wires (i) partially overlaps its corresponding pixel electrodes adjacent to each other along a direction in which the scanning wires extend and (ii) leads from a border between the pixel electrodes toward a central part of each of the pixel electrodes, the signal wires being disposed so that at least part of overlap between each of the signal wires and the pixel electrodes overlaps orientation-changing sections that change orientation of liquid crystal molecules contained in the liquid crystal layer.

Therefore, the present invention makes it possible to achieve a liquid crystal display device capable of reducing display unevenness of an image without reducing an aperture ratio even in a case where signal wires are disposed so that each of them leads toward central parts of corresponding pixel electrodes.

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention makes it possible to achieve a liquid crystal display device capable of reducing display unevenness of an image without reducing an aperture ratio. As such, the present invention is preferably applied to a liquid crystal display device designed to improve in display quality.

The invention claimed is:

1. A liquid crystal display device including an active matrix substrate, a counter substrate, and a liquid crystal layer sandwiched between the active matrix substrate and the counter substrate, the active matrix substrate comprising:

a plurality of scanning signal lines;

a plurality of signal wires disposed in such a way as to intersect with the plurality of scanning signal lines; and pixel sections, each provided in correspondence with a combination of a corresponding one of the scanning signal lines and a corresponding one of the signal wires, which include respective switching elements each of which connects the corresponding signal wire to a corresponding pixel electrode when a scanning signal inputted to the corresponding scanning signal line commands the switching element to be conductive, the signal wires being disposed so that each of the signal wires (i) partially overlaps its corresponding pixel electrodes adjacent to each other along a direction in which the scanning signal lines extend and (ii) leads from a border between the pixel electrodes toward a central part of each of the pixel electrodes, the signal wires being disposed so that at least part of overlap between each of the signal wires and the pixel electrodes overlaps orientation-changing sections that change orientation of liquid crystal molecules contained in the liquid crystal layer, wherein the liquid crystal display device performs dot inversion driving such that a polarity of each source signal is inverted in every scanning signal line while a polarity of each signal is inverted in every signal wire.

2. The liquid crystal display device according to claim 1, wherein the orientation-changing sections are ribs provided on the counter substrate.

3. The liquid crystal display device according to claim 1, wherein the orientation-changing sections are slits provided in the pixel electrodes.

4. The liquid crystal display device according to claim 1, wherein the orientation-changing sections are slits provided in the counter substrate.

5. The liquid crystal display device according to claim 1, wherein:

the counter substrate and the pixel electrodes have the orientation-changing sections provided thereon as ribs each having a bent shape or provided therein as slits each having a bent shape; and the signal wires are disposed so that at least a part of overlap between each of the signal wires and the pixel electrodes overlaps a bent portion of a corresponding one of the ribs provided on the counter substrate and on the pixel electrodes or a bent portion of a corresponding one of the slits provided in the counter substrate and in the pixel electrodes.

6. The liquid crystal display device according to claim 1, wherein:

the counter substrate has provided thereon ribs each having straight portions and a bent portion, and the pixel electrodes have provided therein slits each having straight portions and a bent portion; and the signal wires are disposed so that each of the signal wires overlaps the pixel electrodes in such a way as to partially overlap the straight portions and bent portions of the ribs and the straight portions and bent portions of the slits.

7. The liquid crystal display device according to claim 1, wherein the signal wires and the pixel electrodes are disposed so that those ones of the pixel electrodes which are adjacent to each other with one of the signal wires interposed therebetween are identical in area of overlap with the signal wire.

8. The liquid crystal display device according to claim 1, wherein the signal wires are disposed so that that part of each of the signal wires which overlaps a corresponding one of the orientation-changing parts is at an angle of 45 degrees to 90 degrees with respect to an edge of a corresponding one of the pixel electrodes.

* * * * *